March 17, 1964 W. F. ALTENPOHL 3,124,831
AUTOMATIC RELEASE FOR POULTRY SHACKLES
Filed July 9, 1962 4 Sheets-Sheet 1

William F. Altenpohl
INVENTOR.

BY Clarence A. O'Brien
and Harvey B. Jackson
Attorneys

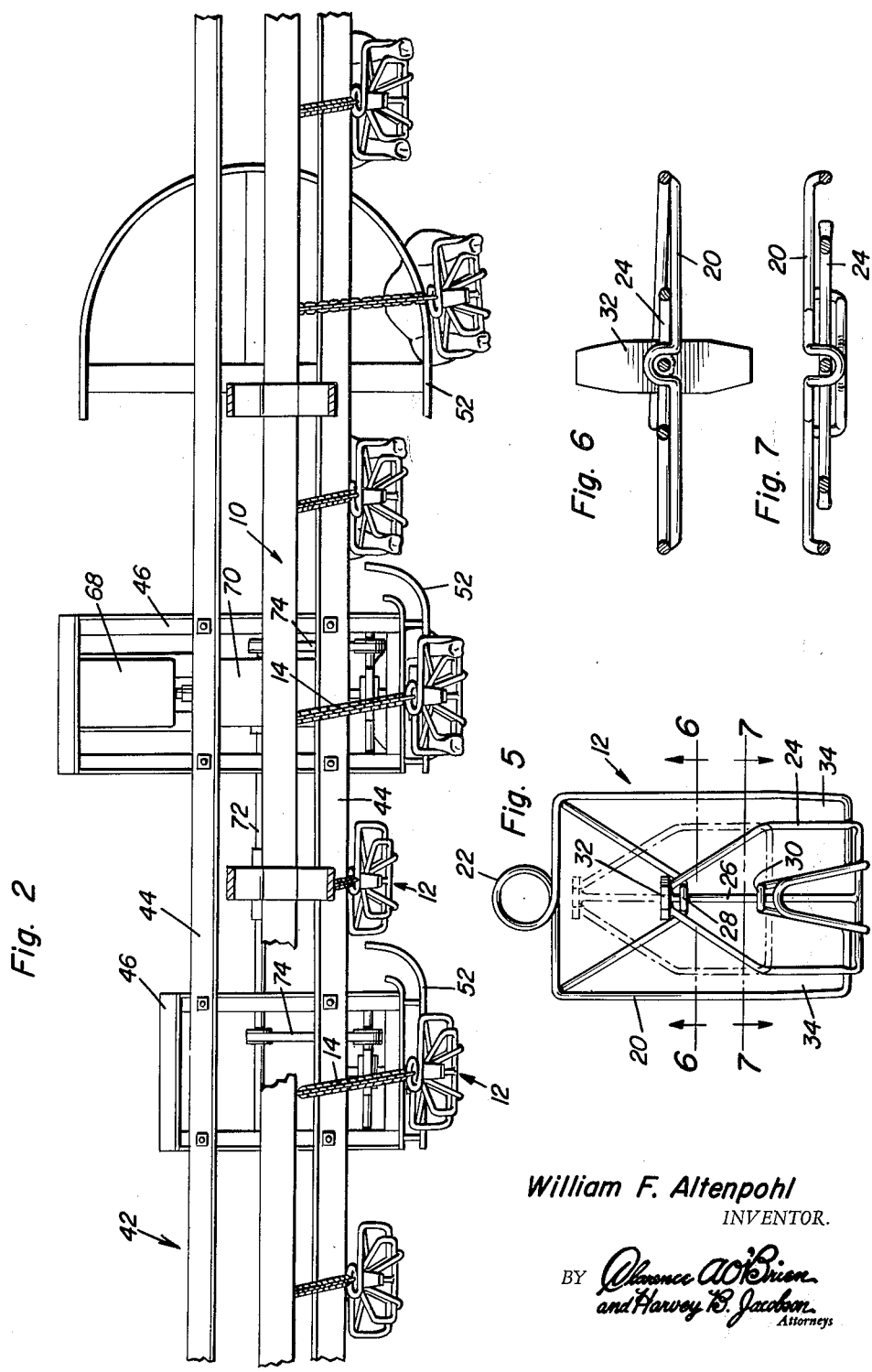

March 17, 1964 W. F. ALTENPOHL 3,124,831
AUTOMATIC RELEASE FOR POULTRY SHACKLES
Filed July 9, 1962 4 Sheets-Sheet 3
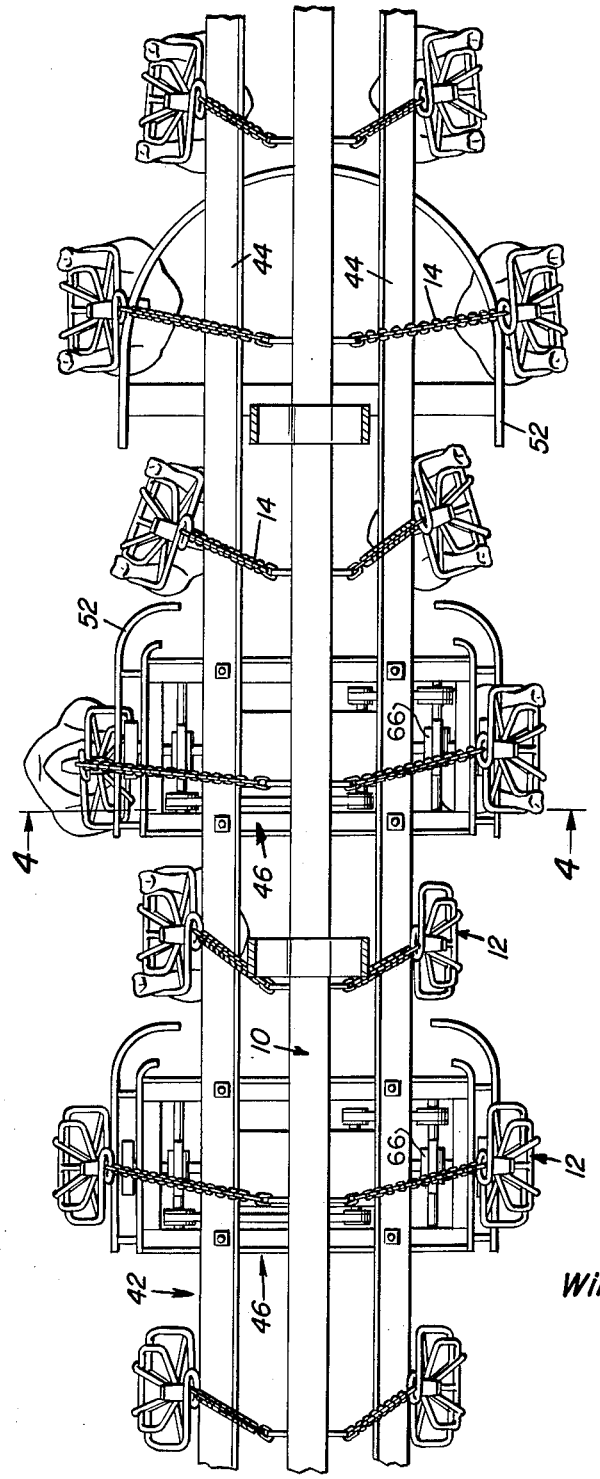
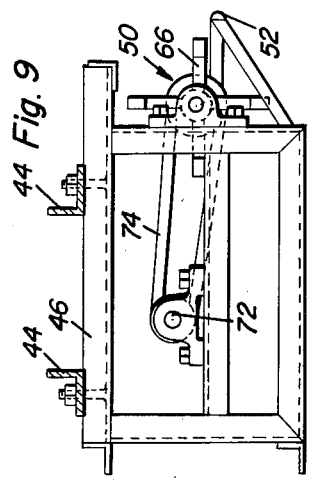
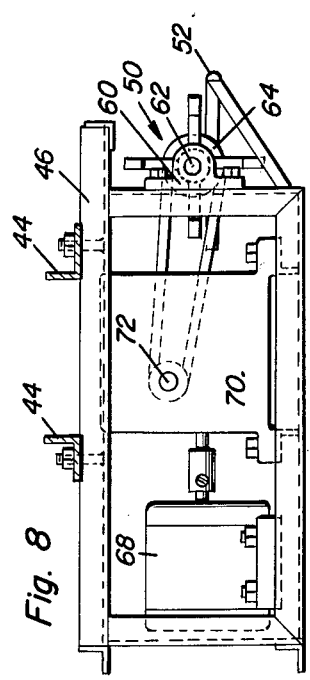
William F. Altenpohl
INVENTOR.

March 17, 1964 W. F. ALTENPOHL 3,124,831
AUTOMATIC RELEASE FOR POULTRY SHACKLES
Filed July 9, 1962 4 Sheets-Sheet 4

William F. Altenpohl
INVENTOR.

United States Patent Office 3,124,831
Patented Mar. 17, 1964

3,124,831
AUTOMATIC RELEASE FOR POULTRY
SHACKLES
William F. Altenpohl, Philadelphia, Pa.
(Union Hill Industries Park, West Conshohocken, Pa.)
Filed July 9, 1962, Ser. No. 208,398
9 Claims. (Cl. 17—11)

This invention comprises a novel and useful auomatic release for poultry shackles and more particularly pertains to a power operated means for effecting the positive actuation of poultry shackles to release the poultry carried thereby at a predetermined station of an overhead poultry conveyor system.

The automatic release mechanism disclosed and claimed hereinafter is specifically adapted for use with various known types of overhead poultry conveyor systems such as that set forth in my copending application Serial No. 137,815 filed September 13, 1961, for Poultry Shackle for Overhead Conveyor and Carriage Assembly, and is especially designed to impart impacts to the actuator of a release means of a poultry shackle whereby to automatically release from the shackle the poultry carried thereby at a delivery station.

A further object of the invention is to provide a release mechanism in accordance with the foregoing object which will enable the lateral displacing of the poultry shackles into two groups each of which is subjected to the action of an automatic release mechanism in accordance with this invention thereby increasing the rate at which poultry may be discharged from the shackles of a conventional overhead conveyor system.

A further and more specific object of the invention is to provide a release mechanism which will impart a series of successive impacts to a single actuator of a shackle release means in order to effectively insure that the shackle will discharge its load at the desired discharge station.

Yet another object of the invention is to provide a release mechanism in accordance with the preceding objects in which a guide rail assembly shall engage and tilt each shackle at its support means at a desired inclination to the vertical plane and in a position which is laterally displaced from the vertical plane through the conveyor track in order to present the shackle release means actuator in a most favorable attitude for engagement by the impact means.

Still another important object of the invention is to provide a release mechanism in which provision is made therein to effect by the influence of gravity a proper orientation of a loaded shackle and thereby position its release actuator most favorably for operation by an impact element of a release mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a preferred embodiment for an automatic release mechanism for poultry shackles and showing its associated relationship with a conventional overhead poultry conveyor system with the direction of travel of the shackles being indicated by an arrow and showing the positioning of the automatic release mechanism with respect to the discharge station of the conveyor system;

FIGURE 2 is a top plan view of the arrangement of FIGURE 1, parts of the conveyor track being broken away;

FIGURE 3 is a top plan view similar to FIGURE 2 but showing a modified construction in which a plurality of lines of shackles are simultaneously subjected to the action of release mechanisms and with the electric motors being omitted therefrom;

FIGURE 5 is an enlarged elevational view of one form of poultry shackle with which the release mechanism of this invention may be effectively employed;

Figure 1:
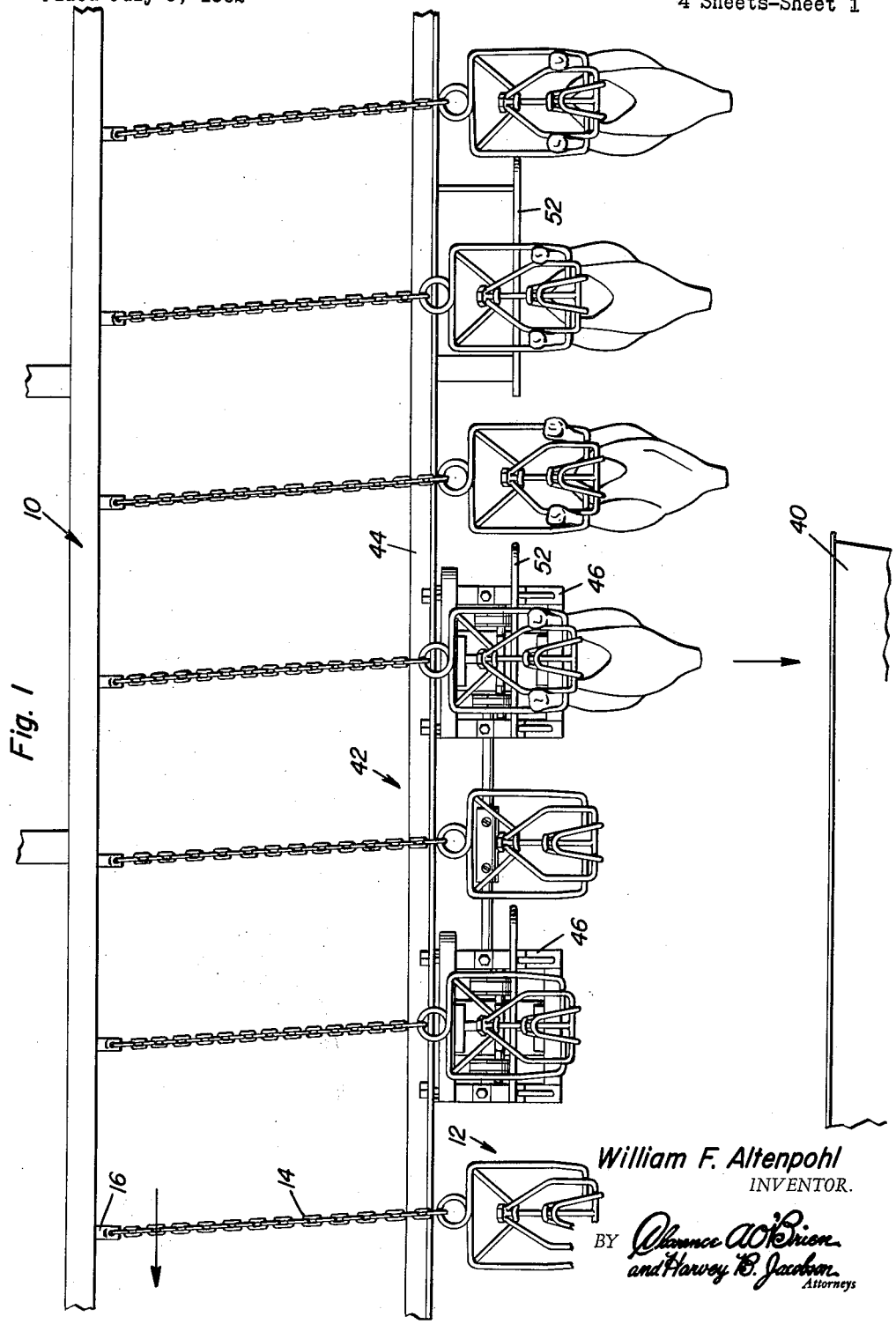

FIGURES 6 and 7 are further enlarged horizontal sectional views taken substantially upon the planes indicated by the section line 6—6 and 7—7 respectively of FIGURE 5 and showing further details of the poultry shackle;

FIGURE 8 is a detailed view showing the mounting of one of the impact means, its source of power and the reduction gearing assembly therefor; and FIGURE 9 is a further detailed view of the mounting of an impact means.

In the accompanying drawings, the numeral 10 designates generally an overhead track forming a part of a conventional overhead poultry conveyor system for transporting poultry for various purposes such as killing, cleaning and eviscerating the poultry. A plurality of poultry shackles each indicated generally by the numeral 12 are secured as by supports 14 which may conveniently take the form of chains or other flexible supporting elements and which include hangers 16, see for example FIGURE 4, which move longitudinally and are retained in the slotted channel members 18 comprising the rail of the conveyor track. An important feature of this invention resides in the flexible supports 14 which enable considerable latitude of movement of the shackles and the loads carried thereby either longitudinally or laterally of the conveyor track 10. Use is made of this feature to facilitate the action of the automatic release mechanism forming the subject matter of this invention.

Although various types of shackles may be utilized with this invention, it being merely necessary that each shackle shall include a releasable poultry retaining means together with a movable actuator projecting laterally from the shackle in order that it may be given an impact to effect movement of the actuator and thus operate the release means of the shackle, a form of shackle has been illustrated in FIGURES 5–7. The illustrated shackle may conveniently comprise the shackle construction set forth and claimed in my copending application Serial No. 208,399 filed July 9, 1962, entitled Poultry Shackle for Overhead Conveyors and Carriage Assembly. For a detailed explanation and construction and operation of this form of shackle, reference may be made to the above identified copending application. Briefly, however, referring to FIGURES 5–7, the shackle includes two relatively movable components consisting of a generally rectangular outer rod-like open support 20 having a supporting loop 22 at its upward end by which it may be secured to the support 14. Slidingly mounted upon the support for vertical sliding movement relative thereto is a second rod-like open frame component comprising a holder and identified by the numeral 24.

The holder includes a vertically extending guiding stem 26 which is slidably retained and guided in upper and lower guide and retaining members 28 and 30 secured to the upper and lower portions of the support 20. In order to effect upward vertical movement of the holder 24, the latter at its upward end is provided with a horizontal, laterally extending bar or plate 32 which comprises an actuator operated as set forth hereinafter, to effect movement of the holder 24 with respect to the support 20 from its gravity lowered position shown in full lines in FIGURE 5 to its raised position shown in dotted lines therein. Pockets are provided between the adjacent side walls of the holder and support as indicated at 34 in FIGURE 5 in which may be disposed and wedgingly retained the legs or neck of the poultry whereby they may be suspended from the shackle. The arrangement is such that in the lowered position of the holder, the pockets 34 close at their lowered ends to thereby retain the neck or legs of the poultry therein. However, when the holder is raised as shown in the dotted line position, there will be provided a clearance between the bottom of the holder and the bottom of the support which is sufficient to permit release of the legs or necks of the poultry from the shackle.

In some instances, operation of the actuator 32 may be effected manually. However, especially where the conveyor track 10 is closely loaded with shackles, a power operated releasing mechanism for automatically operating the actuators at a discharge station such as that indicated at 40 in FIGURE 1 is preferred as being faster and more certain in this operation.

The release mechanism forming the subject matter of this invention consists of a guide rail assembly having an advantageous and improved construction for effectively positioning each shackle and its actuator in a most favorable attitude for operation of the actuator by the impact means of the release mechanism together with a power operated continuously revolvable impact means including striker blades, or paddles, which are positioned to impart a series of upward thrusts or blows to the underside of the actuators as the latter successively move pass the impact means, and thus permit the discharge of the poultry from the shackles into the trough at the collection station 40.

A guide rail assembly indicated generally by the numeral 42 is mounted by any suitable means in a fixed relation to the conveyor track 10 below and extending to opposite sides of the latter as shown more clearly in FIGURES 2, 3 and 4. The guide rail assembly includes a pair of parallel support rails 44 from which are rigidly supported framework platforms 46. Mounted upon and carried by these platforms are impact means indicated generally by the numeral 50, see in particular FIGURES 4, 8 and 9 together with guide rails 52 positioned outwardly of the impact means. The guide rails 52 extend along any desired length of the conveyor track and the guide rail assembly consists of sections spaced longitudinally of the track as illustrated in the accompanying drawings. When the guide rails are continuous for any considerable portion of their length, the rails are provided with inwardly recessed portions corresponding to the clearance between successive rails as shown in FIGURES 1–3 for the purpose which will become subsequently apparent.

Figure 4:
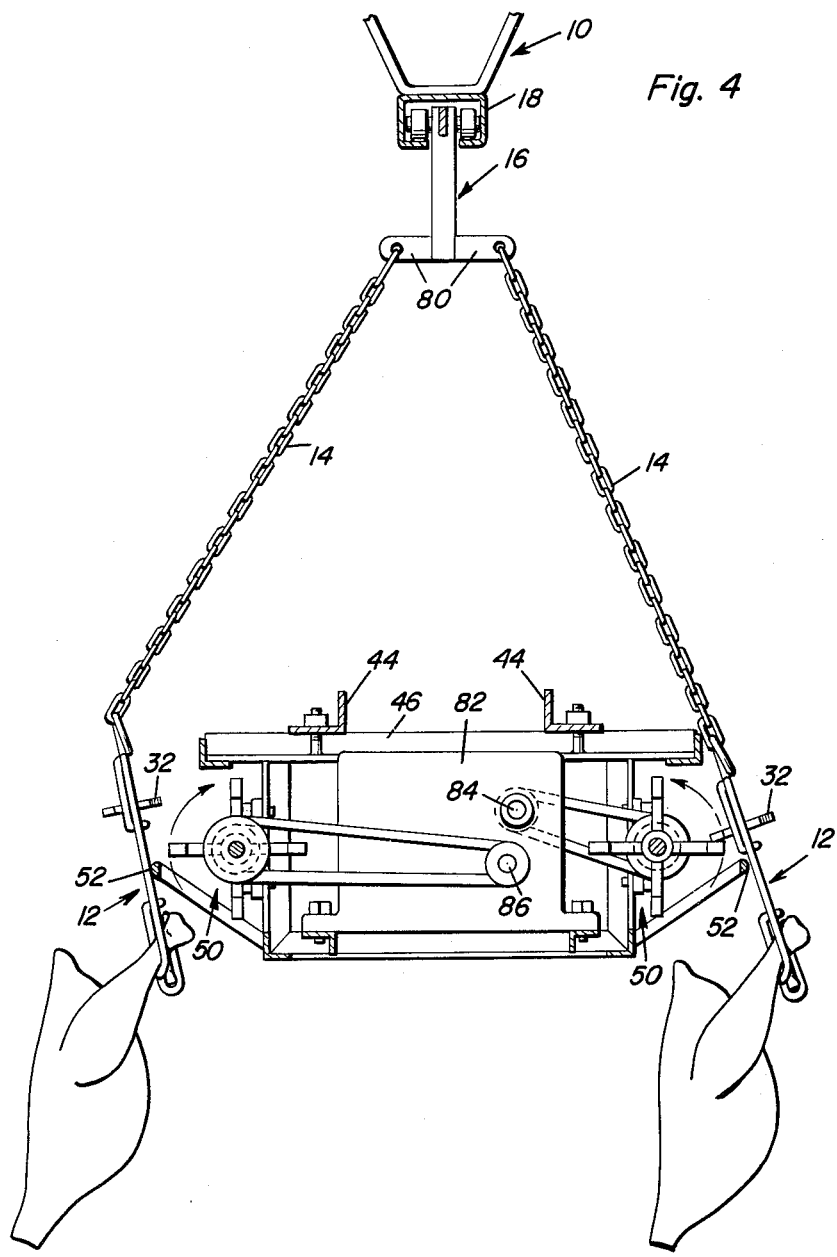
FIGURE 4 is a detailed view in vertical transverse section taken upon a large scale substantially upon the plane indicated by section line 4—4 of FIGURE 3 and illustrating in particular the manner in which the impact means effects operation of the actuator of a shackle release means.

Referring next more particularly to FIGURE 4, it will be seen that the function of the guide rails 52 is to effect a tilting of the supports 14 and the shackles 12 carried thereby to a position which is inclined with respect to the vertical plane through the conveyor track 10 and which is displaced laterally to one or both sides of the latter. This tilting action obviously swings the loaded shackle outwardly and upwardly with respect to its vertical position when the supports and shackles are not in contact with the guide rails. As a result of this tilting action, it is evident that the attitude of the actuator 32 may be oriented with respect to the impact means 50 so as to insure the striking of the actuator by the impact members and thus effect operation of the shackle release means. The leading ends of the rails 52 will, of course, extend inwardly towards the tracks 18 a sufficient distance to prevent the shackles from entering between the rails 52 and the support rails 44.

It sometimes happens that when the shackles are loaded with poultry at the loading station the poultry shackles may hang in different directions so that some of the actuators are not positioned at the most effective attitude for engagement by the impact means. In order to overcome this difficulty the previously mentioned clearances in the guide rails assembly are provided. Regardless of how they are effected the clearances provide sufficient space to enable the previously tilted shackle and its support to now hang vertically in a plumb position under the influence of gravity. Consequently, as the shackle and its support move from the unrecessed or unrelieved portion of the guide rail, into the clearance, under the influence of gravity it will tend to swing and orient itself with respect to the impact means.

Not only does the loaded shackle swing inwardly toward the vertical plane of the conveyor track, but as it passes off from the unrelieved portion of the guide rail, gravity tends to cause the shackle to twist or turn about its vertical axis and thus assume a different position or attitude with respect to the impact means.

By providing a succession of such clearances and impact means, it is evident that sufficient rotation about its vertical axis may be imparted to each shackle to insure that when the shackle moves outwardly on the next section or portion of the guide rail, the shackle actuator will be appropriately positioned for most effective operation by the impact means.

In FIGURE 4 there is shown at the right hand side of the figure a shackle positioned in the proper position for most effective operation, while the left hand side of FIGURE 4 shows a shackle which due to the center of gravity and the manner in which the poultry is loaded upon the shackle, the shackle actuator is not positioned for engagement by the associated impact means. By the aforementioned provision for gravity orientation of the shackles and their actuators through the operation of the above mentioned clearances, the next successive clearance through which the shackle at the left hand side of FIGURE 4 passes will cause rotation of the shackle and proper orientation of the actuator to the position shown at the right side of FIGURE 4 by a reverse tilting of the upwardly extending axis of the shackle.

Referring now to FIGURES 8 and 9 in particular, it will be observed that each of the frame supports provides suitable bearing or journal means 60 by which the axle or shaft 62 of a hook comprising a member or body 64 is journalled for rotation about an axis which is in side-by-side relation to the guide rail 52 and the conveyor track 10. Projecting radially outwardly from the member or body 64 is a plurality of circumferentially spaced impact members or striker blades in the form of paddles or the like 66. A suitable source of power such as an electric motor or the like 68 is likewise mounted on the support frame structure and is coupled to the reduction gearing assembly 70 having an output shaft 72 therefrom. This output shaft is connected as by a pulley and belt drive 74 to the shafts 62 of the impact members. If desired, the motor 68, as shown in FIGURES 2 and 9 drives one impact member or as shown in FIGURES 3 and 4 drives a plurality of such members.

It is an important feature of this invention, however, that the speed of rotation imparted to the impact member shall be such that, when correlated with the speed of travel of the shackles along the conveyor track, the striker members 66 of the impact means will each impart a plurality of blows to the actuator 32 of the shackle release means. Thus, a plurality of successive impact or striker members 66 may engage the actuator as the latter passes the impact means, or if fewer impact blades 66 are provided, each blade may strike the actuator a plurality of times. In any event, the continuously rotating impact means delivers the series of rapid impacts to the actuator thus insuring operation of the latter and releasing of the poultry from the shackle.

In the arrangement shown in FIGURES 1, 2, 8 and 9, the principles of the invention are shown applied to an overhead conveyor system in which the loaded shackles pass the discharge station in a single row. This arrangement is quite satisfactory where there is sufficient spacing between adacjent shackles and the rate of travel is sufficiently slow to afford ample time for orientation of the shackles with respect to the impact means and the successive actuation of the shackle release means at the discharge station. However, in the interest of economy of operation, it is frequently desired to considerably increase the capacity of the conveyor system and the rate at which the shackles are unloaded at the discharge station. For this purpose, a modified construction shown in FIGURES 3 and 4 is preferred. In this construction, the hanger 16 is provided with a pair of laterally projecting support arms 80 each of which carries a support chain 14. However, the support rails 44 previously mentioned have their support frame works 46 provided on opposite sides thereof with a pair of the impact means 50 and with a pair of the guide rails 52. The guide rail assemblies are of the same identical construction previously described including the inwardly relieved portions providing clearances for gravity orientation of the loaded shackles and having the plurality of the impact means for each guide rail assembly. The advantage of this construction is that the shackles may be very closely grouped together upon the single conveyor track, with a spacing therebetween which would be insufficient for orientation purposes. However, when the loaded shackles reach the guide rail assembly, they are divided into two groups, each group passing by one of the pair of impact means disposed on opposite sides of the conveyor track and the associated guide rail provided therewith. Consequently, by the separation of the loaded shackles into groups, the effect of spacing the shackles in each group is increased, thereby affording the necessary time for gravity orientation of the shackles at the clearance spaces.

In the embodiment of FIGURES 3 and 4, it will be appreciated that the motor driven reduction gearing assembly 82 is provided with a pair of power take-off shafts 84 and 86 which by the same pulley drives previously mentioned are each adapted to drive one of the impact member shafts.

This form of the invention operates in the same manner as that previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. An automatic poultry shackle release mechanism for use with an overhead poultry conveyor system of the type having an overhead conveyor track, a plurality of poultry shackles each having a releasable poultry retaining means provided with a laterally projecting movable actuator, supports each secured to a shackle and being secured to said track for movement therealong and for movement of said shackle laterally of said track; said release mechanism comprising a guide rail assembly disposed in fixed relation to and below said track for engaging and positioning each shackle and its actuator in a predetermined attitude, a rotatable impact means disposed adjacent said track and guide rail assembly and positioned to extend into the path of movement of and in contacting relation with said actuators to strike and operate said actuators as successive shackles move therepast whereby to effect release of poultry from said shackles.

2. The combination of claim 1 wherein said impact means is mounted upon said guide rail assembly.

3. The combination of claim 1 wherein said guide rail is positioned to tilt said supports and shackles to a position inclined to the vertical plane through said track and laterally displaced from said vertical plane.

4. The combination of claim 1 wherein said impact means includes a plurality of blades and is continuously rotated at a sufficient speed relative to the rate of movement of said actuators therepast to deliver a plurality of successive impacts to each actuator.

5. The combination of claim 1 wherein said impact means includes a body mounted for rotation about a horizontal axis disposed in side-by-side relation to said track, said body having a plurality of outwardly projecting striker blades.

6. The combination of claim 1 wherein said guide rail assembly includes a pair of guide rails positioned on opposite sides of said track, groups of said shackles and supports being divided and passing along and each engaging one of said guide rails, said impact means including a pair of members each mounted for rotation about an axis disposed in adjacent side-by-side relation with one of said guide rails, each member including outwardly projecting striker elements disposed to strike and operate the actuators of the group of shackles passing adjacent thereto.

7. The combination of claim 1 including a laterally inwardly relieved portion of said guide rail assembly adjacent said impact means and providing clearance into which a loaded shackle and its support may swing and turn and effect gravity orientation of the shackle and its actuator relative to the associated impact means.

8. The combination of claim 1 including a pair of succesively located impact means, cut-away portions of said rail assembly adjacent each impact means providing clearances into which a loaded shackle may swing and turn effect gravity orientation of the actuator relative to the associated impact means.

9. The combination of claim 1 wherein said impact means includes a striker blade of sufficient extent in the direction of travel of said shackles and which striker blade is continuously rotated at a speed relative to the rate of travel of said actuators therepast to deliver a plurality of successive impacts to each actuator.

References Cited in the file of this patent

UNITED STATES PATENTS 2,810,926    Mitchell et al.           Oct. 29, 1957
2,958,092    Curtis                 Nov. 1, 1960